Sept. 4, 1962 M. GLENDENING 3,052,146
SLOT PERFORATING CUTTERS
Filed Sept. 13, 1959

INVENTOR.
MAJOR GLENDENING
BY
Oberlin, Maky & Donnelly
ATTORNEYS

United States Patent Office 3,052,146
Patented Sept. 4, 1962

3,052,146
SLOT PERFORATING CUTTERS
Major Glendening, Benton Harbor, Mich., assignor to F. P. Rosback Company, Benton Harbor, Mich., a corporation of Michigan
Filed Sept. 18, 1959, Ser. No. 840,891
2 Claims. (Cl. 83—660)

This invention relates generally, as indicated, to slot perforating cutters and more particularly to the cutting instrumentality of the machine for cutting lines of perforations in paper and other material to facilitate subsequent severing of the paper into parts.

In the graphic arts field, paper is run through machines to perforate or partially sever the paper to facilitate separation in the line of the perforations or slots, these machines having notched or toothed cutters which operate in connection with opposing dies. These cutters are in the form of thin rotating blades having cutting teeth peripherally spaced thereabout. The configuration of these teeth is such that as the cutter rotates and the paper is moved between the upper toothed cutter and the lower cutter or die, the teeth will remove or sever narrow slots from the paper.

The ideal design for cutters employed in the paper perforating art is to have a tooth configuration such that the tooth will initially pierce the leading edge of the slot, secondarily pierce the trailing edge of the slot and finally cut the elongated sides of the slot to sever and remove the slot from the paper. Tooth profiles of a general V-shape have been employed but in such teeth the depth of the portion of the tooth which cuts the initial and trailing portions of the slot has generally been too shallow properly to sever the leading and trailing edges of the slot before the severing of the center of the slot. Often the trailing edge of the cutter does not pierce the paper before the center; and as a result, the paper slug will curl and often stay attached to the body of the sheet. Tooth forms in which the initial and trailing portions of the tooth are made small or needle-like in appearance perform the desired function of cutting or piercing the ends of the slot prior to the center cutting, but these cutters, however, are very weak, break easily and moreover the needle-like edges of the teeth dull very rapidly. For this reason, the perforating machines must be stopped frequently while the cutters are being replaced and accordingly, inefficiency of operation results. Thus the angle and sharpness of the leading and trailing edges of the tooth must be sufficient to obtain the desired leading and trailing perforations without the tooth being weak and easily dulled.

The depth of the tooth, i.e. the radial distance between the peak of the tooth and the bottom is also a critical factor in the tooth form which permits the production of the proper slot. If the depth of the tooth is too small, the slug will curl and not cut loose from the sheet being perforated. This, is of course, due to the failure of the trailing edge of the cutter to pierce the sheet prior to the severing of the center by the tooth bottom. During strike patterns, when the sheet of paper is to be perforated only for a short distance, as for example 6", the two cutters are moved apart such that for the beginning and end portions of the line of perforations, the slug is not removed from the sheet and only a partial slot is produced until the two cutters either separate entirely or come within the cutting range. This partial perforation is called "run-out" and is, of course, not desirable. It can be seen that if the depth of the tooth is at a minimum, then no such "run-out" will occur and that such "run-out" will be at its maximum with a maximum depth of tooth.

Thus the tooth angle, the depth of the tooth form, including both maximum and minimum limitations, and the tooth sharpness are factors which effect the quality of slot produced. In prior perforators, these critical limitations have not been fully satisfied and as a result, perforations in which the slug curls and stays attached to the body of the sheet are often seen and, moreover, burrs or other projections protrude from the cut slot which increase the paper thickness when it is stacked and this inhibits proper subsequent operations on the paper. Furthermore, in perforating teeth with too large a tooth depth, the aforementioned "run-out" problem is prevalent.

It is accordingly a principal object of my invention to provide a slot perforating cutter which will produce slots in which the paper slug is removed cleanly and effectively.

It is a further principal object of my invention to produce a paper slot perforator which will give the maximum perforating qualities and yet minimize the problems due to "run-out" for short length perforations.

It is another object of my invention to produce a slot perforating cutter which will cleanly sever the slot from the paper producing no jagged edges or burrs to enable the slots to be produced in such paper more quickly and effectively.

It is still another object of my invention to provide a slot perforating cutter in which the tooth angle, the depth of tooth form and the tooth sharpness are such as to produce the aforementioned desired slot perforating characteristics.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
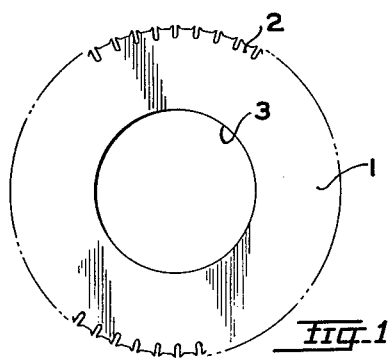
FIG. 1 is a profile of a rotary slot perforator constructed in accordance with my invention.

Referring now to the drawing and more particularly to FIG. 1, I have illustrated a typical slot cutter to be used on a rotary slot perforating machine. This cutter, designated as 1, is a thin circular sheet of hardened steel such as Ward's Open Hearth Annealed Spring Steel. Such rotary perforators may vary in size depending upon the slots to be perforated and the one illustrated being typical of a standard size may, for example, be of approximately 2½" outside diameter and .015" thick. The thickness of the cutter will, of course, govern the thickness of the slot to be perforated. The cutter 1 has a plurality of teeth 2 equally spaced about the periphery thereof, the number of which may vary again depending on the size of the slot to be perforated. For example, the number may vary from 24 teeth to as many as 92 teeth. The rotary cutter has a central cutout portion 3 such that it may be mounted on a rotatable mandrel.

Figure 2:
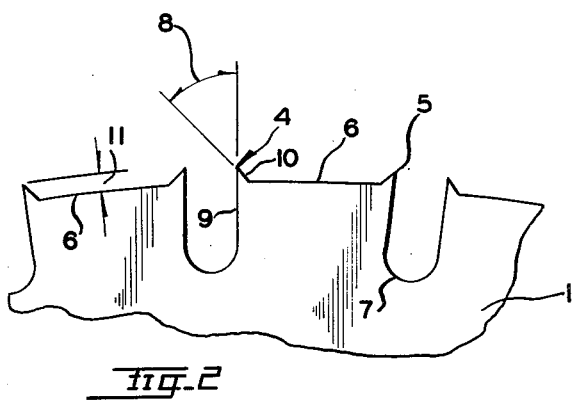
FIG. 2 is an enlarged fragmentary view of the teeth of the cutter shown in FIG. 1.

FIG. 2 illustrates on an enlarged scale the tooth profile provided in accordance with my invention. It will be seen that each tooth comprises a leading portion 4, a trailing portion 5 and a tooth bottom 6 extending therebetween. The teeth are separated by cutout portions 7, the shape of which may vary as per hob requirements. The leading and trailing portions of the tooth are quite pointed as clearly illustrated and it is these portions which will perforate the initial and trailing portions of the slot respectively. The relatively flat tooth bottom 6 will then sever the center of the slot after the portions 4 and 5 have severed the ends of the slot. The tooth angle 8 is the angle formed by one parallel side 9 of the tooth and by the short side 10 of the portion 4 or 5 tapering off toward the center of the tooth. These sides terminate in a sharp point which is the vertex of the angle in question. I have discovered that this angle should be between 35 and 45° and preferably between 40 and 45° for improved cutting action without the disdvantages of weakness and fast dulling. It will be understood that variations within this range of the angle will occur according to the diameter of the cutters and the depth of penetration.

The depth of the tooth form is indicated at 11 and is the radial distance between the peak of the tooth formed by the sharp leading and trailing edges 4 and 5 and the flat bottom 6 of the tooth. This depth of tooth is controlled by two factors, one of which effects the minimum depth and the other the maximum. If the depth is too small, the center or bottom of the tooth will sever the center of the slot prior to the trailing pointed portion of the tooth severing the trailing end of the slot. As the result of this, the slug will curl and not be cut loose from the sheet. Thus the depth of the tooth must be sufficiently large to permit the trailing edge of the cutter to pierce the sheet prior to the bottom of the tooth severing the center portion of the slot.

Figures 3, 4:
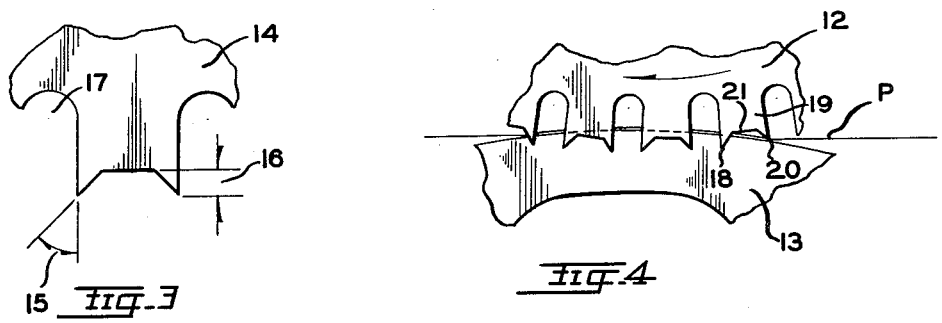
FIG. 3 is a fragmentary view of another cutter having teeth of relatively reduced width.
FIG. 4 is a fragmentary view showing the relation of the upper and the lower cutters employed with my invention.

The reason for keeping the depth of the tooth from being too great is somewhat more obscure. As shown in FIG. 4, a cutter 12 is rotated above a lower cutter or die 13 and the paper P is passed therebetween. These cutters are moved toward each other and apart to form a strike pattern. A strike pattern is the perforation of the sheet, for say 6" in the center of an 18" sheet. In this manner the cutters must be moved into proper relative position to effect the perforation of the sheet during this 6" slotting operation and must be moved apart such that the perforations will not continue beyond the desired length.

It can easily be understood that as the cutters move apart and the tooth bottom rises above the periphery of the lower cutter, the slug will no longer be removed from the sheet but will show as a partially perforated slot until the two cutters separate entirely. Thus the range of movement of the two cutters when the sharp leading and trailing portions only of the teeth of the cutter 12 penetrate beyond the periphery of the cutter 13 causes the imperfect perforation which is called "run-out" in the trade and is highly undesirable. It can now be seen that the length of this "run-out" is directly proportional to the depth of the tooth; the smaller the tooth depth, the shorter the "run-out."

After long experimentation, I have found that the depth of the tooth of the standard size cutters in question giving best results for "run-out" but still maintaining the ability of the trailing edge of the cutter to cut or pierce the sheet prior to the center cutting of the sheet is within the range of from about .014 to about .020". Again, of course, variations within this range may take place depending on the diameter of the cutters and the depth of penetration. I have now described the three basic dimensions and characteristics and their related effects on perforating paper, these being:

(1) Tooth Angle
(2) Depth of Tooth Form:
    (a) maximum limitations ("run-out" minimum)
    (b) minimum limitations (proper cutting)
(3) Tooth Sharpness The tooth sharpness is, of course, related to the tooth angle and if the proper angle is produced, a proper tooth sharpness will also be produced. Using an angle and depth of tooth within the ranges specified provides a paper perforator in which the slug will be quickly and readily removed and a clean perforation will result.

In FIG. 3, I have illustrated a slightly modified rotary perforator 14 in which the tooth is not quite as wide as the tooth shown in the FIG. 2 embodiment. However, the tooth angle 15 and depth of tooth 16 are still within the ranges specified.

It can be seen that the sharper the tooth, the more readily paper fibers can be cut and in order to maintain this sharpness, in forming the tooth, I alternately cut the tooth form and the slot 17 between the teeth. With this method of cutting, the tooth sharpness is assured.

The dimensions that I have established for the tooth angle and the tooth form hold true on any length of tooth, length in this case meaning the slug length removed from the paper.

For the tooth form shown in conjunction with the cutter illustrated in FIGS. 1 and 2, I prefer that the tooth angle 8 should be between 40 and 45° and the depth of the tooth between .018 and .020". The cutout portion 7 is preferably .082" deep and .040 to .045" wide. The width of the cutter is .015" and the cutout portion 3 has an inside diameter of approximately 1¼" and the cutter has an outside diameter of approximately 2½".

For the reduced tooth width cutter shown in FIG. 3, the inside and outside diameters and the cutter width may be the same. The tooth angle 15 is 40° and the tooth depth is between .014 and .016". The depth of the cutout portion 17 is .065" and such cutout portion is between .038 and .040".

The bottom lengths of the teeth are determined by three factors i.e., tooth angle, depth of tooth and circular pitch. The circular pitch is the distance between a point on one tooth and the same point on an adjacent tooth. This circular pitch is standardized in the industry and is specified by stating the number of teeth in one inch. For the established circular pitch sizes, the length of the flat bottom portions of the teeth are as follows:

12 to-one-inch—.017 bottom length approximately
9 to-one-inch—.043 bottom length approximately
6 to-one-inch—.088 bottom length approximately
4 to-one-inch—.186 bottom length approximately
3 to-one-inch—.247 bottom length approximately Referring now to FIG. 4, it will be seen that my perforator operates in the following manner. The cutter 12 is rotated in a counter-clockwise direction as shown in FIG. 4 and the paper P is passed between the upper perforator 12 and the lower cutter of die 13. The leading portion 18 of the tooth 19 initially severs the leading portion of the slot and the trailing portion 20 next severs the trailing portion of the slot. Finally, the center or bottom of the tooth 21 severs the center of the slot and the severed slug now falls away. Thus, with my new slot perforating cutters, a clean perforation is obtained and there is very little burr formed at the portion where the slug is torn loose and, of course, there are no attached slugs.

With good perforations being obtained, the operator will normally run the perforating machine at a much higher speed and, in this manner, increase the output of the machine. In the case of carbon forms where the paper has to be carbonized after perforating, there is a great advantage obtained over that of conventional cutters in that the slugs are entirely removed. If they are not, they fall off in the carbonizing operation and adhere to the blanket on the carbon press preventing the next sheet from being carbonized at that point. Similarly, any operation taking place after that of perforating is greatly facilitated by not having the disadvantage of the large burrs or attached slugs to contend with.

Other modes of applying the principles of the invention may be employed, change being made as regards the details described, provided the features stated in any of the following claims or the equivalent of such be employed.

I, therefore, particularly point out and distinctly claim as my invention:

1. A slot perforator for forming a linear row of perforations in sheet material comprising a circular toothed cutter, each tooth comprising a leading and trailing portion and a center portion, said leading and trailing portions being sharply pointed and projecting radially equally beyond the tooth center portion, said center portion presenting a flat bottom cutting surface of substantially uniform radius for severing the center of the slot after the leading and trailing portions of the tooth have severed the leading and trailing portions of the slot respectively, the tooth center portion being at a depth within the range from about .014 to about .020" below the leading and trailing portions of the tooth.

2. A slot perforator for forming a linear row of perforations in sheet material comprising a circular toothed cutter, each tooth comprising a leading and trailing portion and a center portion, said leading and trailing portions being sharply pointed and projecting radially equally beyond the tooth center portion, said center portion presenting a flat bottom cutting surface of substantially uniform radius for severing the center of the slot after the leading and trailing portions of the tooth have severed the leading and trailing portions of the slot respectively, the leading and trailing portions of the tooth forming a tooth angle within the range of from about 35 to about 45° and the tooth center portion being at a depth within the range from about .014 to about .020" below the leading and trailing portions of the tooth.

References Cited in the file of this patent

UNITED STATES PATENTS 2,769,496  Spinner _____ Nov. 6, 1956

FOREIGN PATENTS 138,201  Germany _____ Jan. 22, 1903